June 17, 1958 W. RINKER ET AL 2,838,840
COMPARISON MEASURING APPARATUS FOR BORINGS
Filed April 21, 1955 3 Sheets-Sheet 1

INVENTORS.
Wilhelm Rinker
BY Walter Jung
Benj. T. Rauber
their attorney

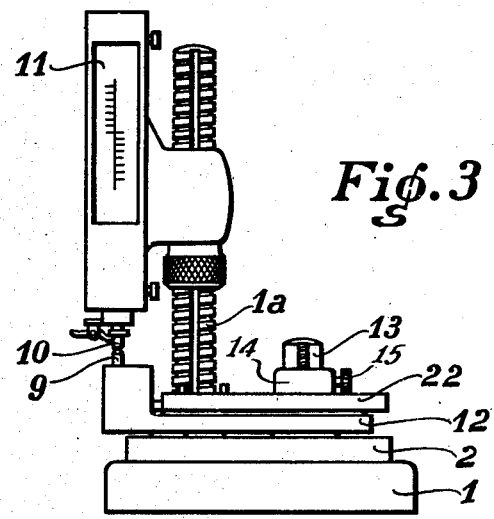
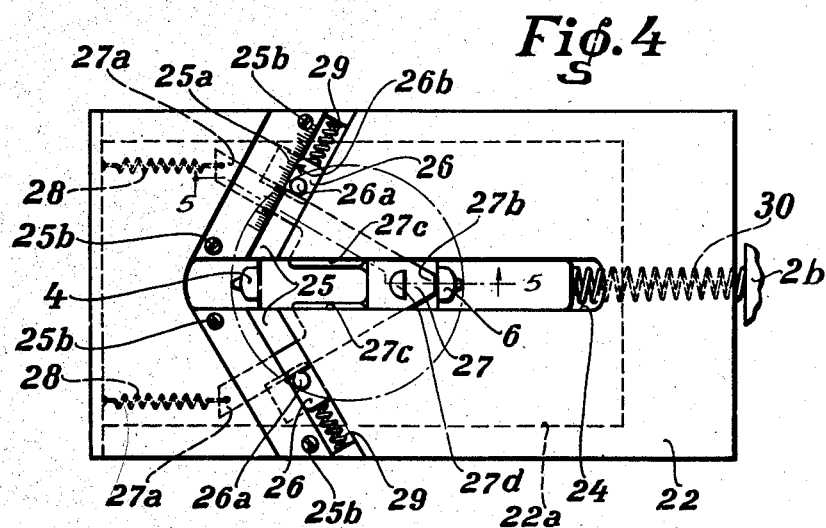

June 17, 1958  W. RINKER ET AL  2,838,840
COMPARISON MEASURING APPARATUS FOR BORINGS
Filed April 21, 1955  3 Sheets-Sheet 3

INVENTORS
WILHELM RINKER &
WALTER JUNG
BY
ATTORNEY

United States Patent Office 2,838,840
Patented June 17, 1958

2,838,840

COMPARISON MEASURING APPARATUS FOR BORINGS

Wilhelm Rinker and Walter Jung, Wetzlar, Germany, assignors to Ernst Leitz, G. m. b. H., Wetzlar-Lahn, Germany, a corporation of Germany Application April 21, 1955, Serial No. 502,812

Claims priority, application Germany July 30, 1954

8 Claims. (Cl. 33—148)

Our invention relates to comparison measuring apparatus for borings. The apparatus has a test lever and a three point support which is constructed of a key finger adjustably and lockably mounted on the base of the apparatus and two justifying fingers which are carried by a holder slidable relative to the base by the action of a spring so that they may be moved to a position forming with the test finger two of the three points that determine the position and diameter of the comparison piece.

In apparatus of this general type heretofore known each of the two justifying fingers to fill out or "justify" the three points of the circle is mounted symmetrically on opposite sides of the test lever on a respective end of two guide rods, which are slidably guided in the body of the apparatus and can be fixed or locked relative to each other by a holder. Upon a forward and reverse movement of the holder the sidewise distance of these adjustable or justifying fingers remains the same to each position and in each measurement. With this arrangement an automatic adjustment or justification of the specimen can be obtained. It is satisfactory only when the distance between the two justifying fingers is about as great as the distance between one of these fingers and the test lever at the nominal value of the boring measured. The greater, however, for example, the distance between the justifying finger and the test key relative to the constant distance between the two justifying fingers, so much less is the spring pressure acting on the justifying fingers, which seeks to bring each centering or justifying finger, by shifting, into a stable position of equilibrium relative to the specimen. Moreover, since the friction on the support setting cannot be entirely eliminated, the culmination point can no longer be exactly set. The measuring range of this apparatus must then be held in very narrow limits.

This deficiency is obviated in our invention in which the justifying fingers of the holder are arranged adjustably and lockably transversely to its direction of shifting. It is thereby possible to compensate the distance between the justifying fingers to the distance between each justifying finger and the test finger and with it also to the nominal diameter of the specimen. To this purpose each justifying finger is secured on a slide which slides in a guiding groove of the holder. The guiding grooves are positioned symmetrically to the line between the two measuring points and preferably at an angle of 120° to each other. Through this last mentioned measure the shifting of the holder upon the adjustment to a new nominal diameter is avoided. The guiding groove can moreover be provided with numerical data for a scale carrying the diameter of the test piece or specimen and the slide may be provided with an index mark. To facilitate the adjustment of the justifying fingers the slides can be adjustable by a common adjustment means. The adjustment of the test finger can, moreover, be coupled with the same adjustment means. For example, an angle shaped rail under spring pressure serves for this purpose with its arms in contact with both justifying fingers and its apex in contact with the test finger. This rail can be built into the apparatus itself or may be applied as an attachable template. In order that the justifying fingers shall lie against the rail they are acted upon by a pressure spring. The slide and the slidable justifying fingers are, moreover, provided with clamping means.

In accordance with the invention the holder may be constructed as a supporting table for the specimen. A lengthwise slot must then be provided in the range of movement of the test finger and of a test lever. To compensate for possible error in the setting of the justifying fingers the supporting table is, moreover, pivotally mounted to swing horizontally and is adjustable in height. To adjust to an exact culmination point an adjusting screw mounted on the base serves to engage the pivoted part of the table.

In the measuring arrangement of the invention not only the inner diameter but the lack of homogeneity or lack of trueness of the boring can be tested in a simple manner. For this purpose it is only necessary to turn the mounted specimen at any time about a small angle. The justifying adjustment then follows automatically through the three point mounting in each position without requiring an adjustment of the original alignment of the adjustment fingers. In order to be able to measure in each range of depth of the boring the table is adjustable in height relative to the test lever and test finger. In a manner suitable to the purpose the apparatus can according to our invention be coupled, moreover, with an arrangement for comparative measurement of outside diameters. Optical and tolerance reading means can be provided for reading the measuring results or data.

The invention is more particularly exemplified in the embodiments of the accompanying drawings in which Fig. 1 is a vertical section of a mounting table for the specimen;

Fig. 3 is a front view of an assembly of the comparing measuring means;

Fig. 4 is a plan of a mounting table for the specimen with an adjusting rail installed.

Figure 1:
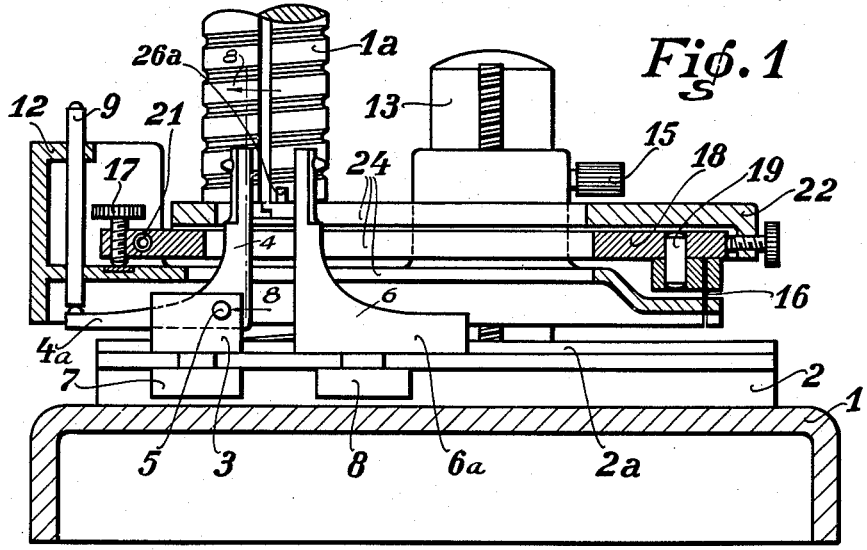
Figure 2:
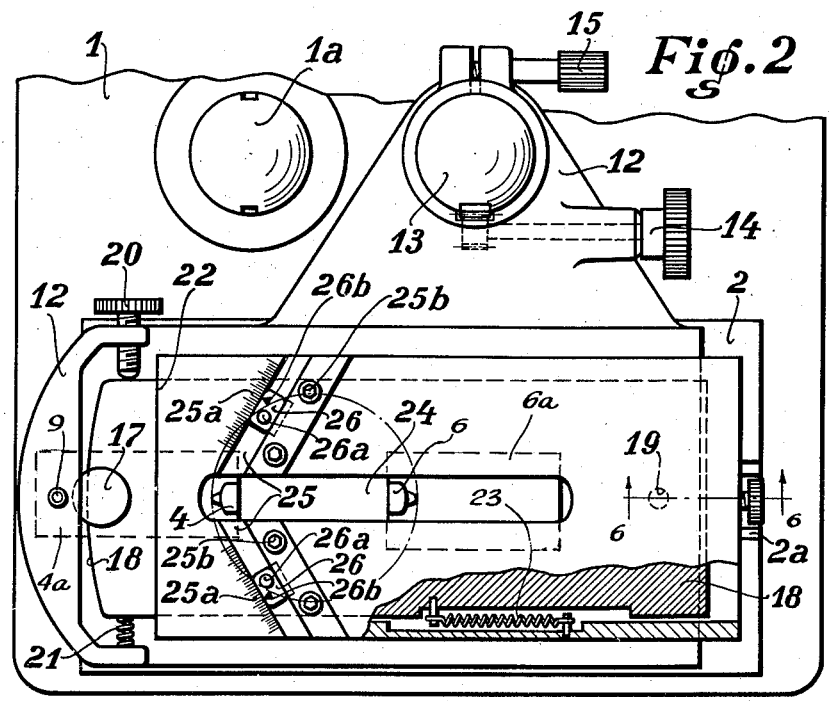
Fig. 2 is a plan view of the mounting table partly in horizontal section.
Figure 8:
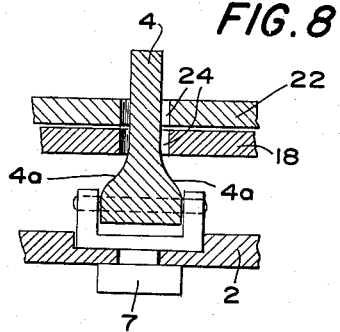
Fig. 8 is a vertical section of the test lever 4 taken on line 8—8 of Fig. 1.
Figure 7:
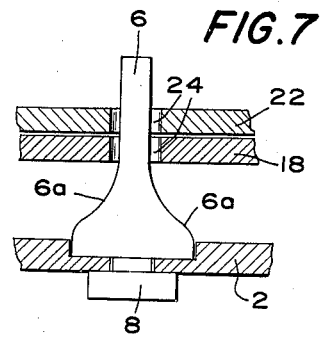
Fig. 7 is a vertical front elevation of the test finger 6.

In the embodiment illustrated in the drawings there is mounted on a base 1 of the apparatus a mounting piece 2 having a guideway 2$^a$ which receives a bearing block 3 for a test lever 4 rockably mounted on an axle 5 and also receives a test finger 6 slidable toward and from lever 4. The test lever 4 may be clamped in the guideway by means of clamp 7 and remains in its original adjusted position for all measurements. A clamp 8 serves to clamp the test finger 6. The lower part of the test lever 4 may be widened as shown at 4$^a$ in Fig. 8, pivotally supported in the bearing block 3 to provide a larger base area against which the clamp 7 may act. Similarly the lower part of the test finger 6 is broadened as at 6$^a$ to provide a wider base against which clamp 8 may act. The rocking movement of the test lever 4 is accomplished by means of a rod 9, Figs. 1 and 3, under a spring pressed test bolt 10 of an indicating instrument 11 slidably mounted on a pillar 1$^a$. The rod 9 is arranged in a carrying plate 12 which is adjustable vertically by means of an adjusting knob 14 on a supporting pillar 13 fixed on the base 1 and may be clamped in position by a knob 15. On the carrying plate 12 is set a table formed of two plates 18 and 22. The lower plate 18 is supported on the carrying plate by means of a spring hinge 16 and a positioning screw 17 by which it can be adjusted vertically. It is also capable of being swung slightly about an axle 19 by means of an adjusting screw 20 and spring 21 mounted in the carrying plate 12. The upper table plate is axially slidable on the lower plate 18 by any suitable guide and slide means such, for example, as bearing balls between the downturned edge of the upper plate 22 and the side edges of the supporting plate 18. As the particular construction of this sliding means is not a feature of the invention it is not disclosed. The upper plate 22 is drawn lengthwise to the left as shown in Fig. 2 by means of a tension spring 23 secured at one end in the downward flange of plate 22 and the side of plate 18. Such a spring may be placed at each side of the plates.

Figure 5:
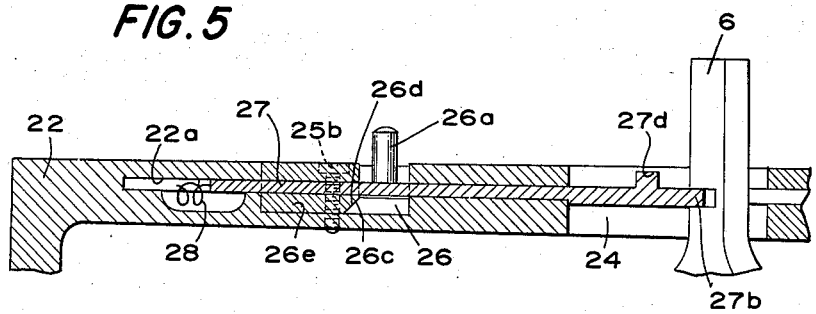
Fig. 5 is a vertical section of the upper table plate taken on line 5—5 of Fig. 4.

The table plates and the carrying plate are provided with lengthwise slots 24 through which the test lever 4 and the test finger 6 project. On the upper table plate 22 are two guide grooves 25 one at each side inclined at an angle of 60° to the line between test members 4 and 6 with the apex arranged at the contact point of the test lever 4. In these guide grooves move slides 26 which are each provided with a justifying finger 26ᵃ and index mark 26ᵇ and which may each be clamped in fixed position by a screw 25ᵇ. For this purpose the slides are provided with a bevelled edge 26ᶜ overlapped by a reversely bevelled edge 26ᵈ, Fig. 5, of a clamping plate 26ᵉ secured by the clamping screw 25ᵇ. Lengthwise of each guide groove 25 is provided a scale 25ᵃ with value indicating numbers for the diameter of the specimen. The two justifying fingers 26ᵃ form with the test finger 6 the three point mounting for the specimen which can be placed on the upper table plate provided as a holder for the justifying fingers 26ᵃ.

Figure 6:
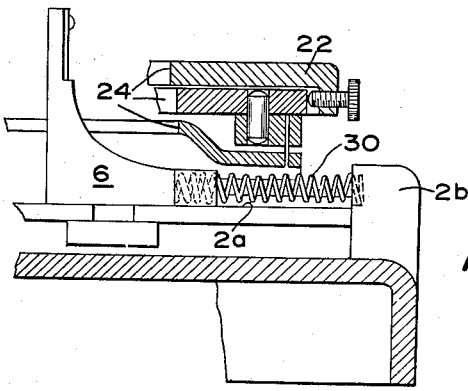
Fig. 6 is a vertical longitudinal section of a part of the apparatus taken on line 6—6 of Fig. 2.

In the example of Fig. 4 the upper table plate 22 is provided with an adjustment arrangement for the justifying fingers 26ᵃ. It comprises a V-shaped rail 27 shown in broken lines and is arranged in a hollow space 22ᵃ of the table plate 22 with its arms 27ᵃ in contact with the justifying fingers 26ᵃ respectively and its apex with the test finger 6. The rail 27 is guided by guide pieces 27ᶜ extending from it into, and slidable, in the lengthwise slot 24 in the plate 22 and is movable longitudinally of the slot against the action of springs 28 by means of the gripping piece 27ᵈ. Springs 29 press the slides 26 against the arms of the rail when the screws 25ᵇ are loosened. The spring 30 presses against the test finger 6 and at its opposite end is set in a stop 2ᵇ on the support piece 2 (Fig. 6). The spring 30 serves to push test finger 6 toward test lever 4 when not clamped by the clamp 8.

To test a specimen the three point mounting is first fitted to the nominal diameter. To this end the index marks 26ᵇ are adjusted and the slides 26 clamped fast. After applying a comparison piece the test finger 6 must be brought into contact with the inner surface. Thereby the justifying fingers and the contact point of the test lever come into position. The test finger 6 is then moved further in the same direction and with it the upper table plate 22 with the justifying fingers until the test lever 4 takes its mid position and the indicating instrument 11 then points nearly to its zero or null position. In this position the test finger 6 is clamped fast by means of the clamp device 8. By shifting the adjusting screw 20 the table plate 18 is then swung until in a given situation the culmination point indicated by the indicating instrument is reached. Thereafter the exact null point of the indicating instrument 11 will be adjusted in a known manner through a reset or regulating means. Any variation in diameter of successive specimens being tested will be indicated in the indicating instrument 11 by variations in one direction or the other from the null point caused by a tilting of the test lever 4 and a transmission of its movement or change of position through the rod 9 to the actuating bolt 10. The rail 27 constructed according to the embodiment of Fig. 4 facilitates the coordination of the three point mounting in that the shifting of the test finger and of the justifying fingers takes place simultaneously. After clamping them in their positions of adjustment, upon releasing the gripping piece 27ᵈ the rail slides back again to its starting position. Specimens can now be mounted and be tested successively without further adjustment.

In testing successive workpieces table 22 is drawn to the right against the tension spring 23 carrying with it the justifying fingers 26ᵃ and 26ᵇ so that these fingers and the test finger 6 are within the opening to be measured, whereupon release of the gripping element 27ᵈ the spring 23 will move the plate until workpiece has a three-point contact with the test finger 6 and the justifying fingers 26ᵃ and 26ᵇ. With each positioning of a workpiece the table must be moved backward and upon release will be carried forwardly by the spring 23. The justifying finger 26 together with the test finger 6 establish the exact culmination position of the workpiece relative to the measuring base 4–6.

Setting of the justifying finger 26ᵃ as well as of the test finger 6 occurs before the precise measurement by means of a qualified comparison piece. The diameter of the workpiece being measured is thereupon given on the scale 25ᵃ. The parts 26 are to be set at the diameter. The test finger 26 is thereupon moved outwardly until it lies at the inner surface of the comparison piece laid in between.

In contrast to this setting a release of the adjustment is provided as shown in Fig. 4. The scales 25ᵃ are in this case dispensible. After mounting a comparison piece, the rails 27 are shifted in such a manner that the pieces 26ᵃ and 6 come to position at the inner surface of the comparison piece. These parts are now clamped fast. For the succeeding measurements which are to be taken in the same manner as the above example, the function of the springs 29 and 30 is ended. The same holds for spring 28 and rails 27.

Having described our invention, what we claim is:

1. Comparison measuring apparatus for borings and the like which comprises a base, a test finger adjustably and securably mounted on said base, a test lever pivotally mounted on said base spaced from said test finger and tiltable in the plane of the test finger, a table comprising a plate mounted on a vertical pivot to swing in a horizontal plane and on a horizontal hinge to tilt vertically relative to said base and having a slot extending between and receiving said test finger and said test lever and having a pair of grooves one extending transversely from each side of said slot at an acute angle thereto, a pair of justifying fingers one for and slidable in one of each of said pair of grooves and securable in its respective groove and a V-shaped rail in said table plate and slidable longitudinally of said slot and positioned to have each of its arms contact one of said slidable justifying fingers and movable to bring its apex to coincide with the test finger, springs to draw said rail from contact with said justifying fingers and from coincidence of its apex with the test finger and a handgrip to enable it to be moved into position against the action of said springs.

2. The apparatus of claim 1 in which springs are provided to press the justifying fingers toward the slot.

3. The apparatus of claim 1 having an indicating mechanism actuated by the tilting of the test lever.

4. The apparatus of claim 1 in which the table may be elevated from the base and having means to elevate the table.

5. The apparatus of claim 1 in which the table plate is slidable relative to the base in a direction longitudinal of the slot and in which said table has spring means to slide said table plate in a direction toward the test lever.

6. The apparatus of claim 1 having an under plate below and supporting said table plate and a spring hinge supporting said under plate and means to tilt said plates upwardly on said spring hinge.

7. The apparatus of claim 6 having a vertical axle projecting upwardly from said hinge to said under plate and means to swing said under plate and table plate about said axle.

8. Comparison measuring apparatus for borings and the like which comprises a base, a test finger adjustably and securably mounted on said base, a test lever pivotally mounted on said base spaced from said test finger and tiltable in the plane of the test finger, a carrying plate mounted for vertical adjustment on said base, a hinge mounted on said carrying plate to tilt vertically and having a vertical axle, a table comprising a lower plate carried on said hinge to tilt vertically and to swing sidewise about the axis of said axle and an upper plate mounted on said lower plate to slide longitudinally thereof, said table plates having longitudinal slots to receive said test finger and said test lever to permit longitudinal movement of said upper table plate relative thereto and to permit a slight sidewise movement of said table plate, said upper plate having grooves one extending transversely from each side of said slot, a pair of justifying fingers one for and slidable in one of each of said grooves and securable in its respective groove, a V-shaped rail between said table plates and slidable longitudinally of said slot and positioned to have each of its arms contact one of said slidable justifying fingers and movable to bring its apex to coincide with the test finger, springs to draw said rail from contact with said justifying fingers and from coincidence of its apex with the test finger, a hand grip to enable the V-shaped rail to be moved into position against the action of said springs and means to measure the tilting of said test lever.

References Cited in the file of this patent

UNITED STATES PATENTS

| | | |
|---|---|---|
| 1,308,324 | Bellard | July 1, 1919 |
| 2,024,020 | Aldeborgh | Dec. 10, 1935 |
| 2,392,617 | Sisson | Jan. 8, 1946 |
| 2,515,214 | Goldbergh | July 18, 1950 |